3,429,330
MOUTHPIECE FOR ORALLY OPERATED VALVE
Armen Bogossian, Teaneck, N.J., and Henry H. Mackal, Fort Lauderdale, Fla., assignors to Halkey-Roberts Corporation, Paramus, N.J., a corporation of New Jersey
Original application Feb. 4, 1964, Ser. No. 342,425, now Patent No. 3,351,081, dated Nov. 7, 1967. Divided and this application Apr. 26, 1967, Ser. No. 633,784
U.S. Cl. 137—223       5 Claims
Int. Cl. F16k *15/20, 15/00;* B60c

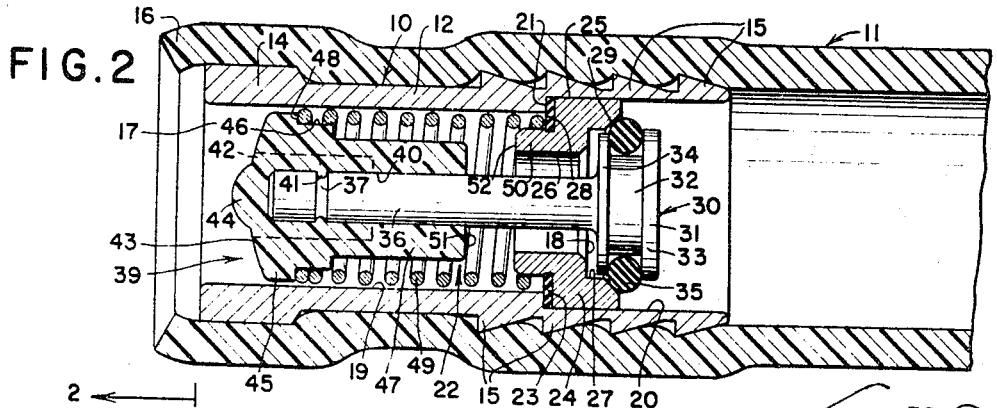
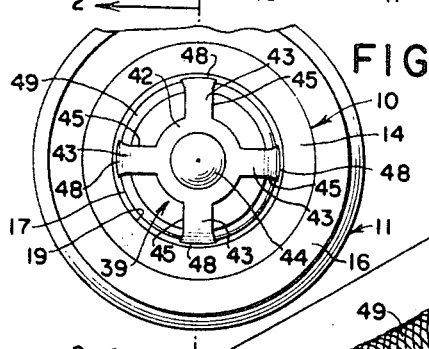
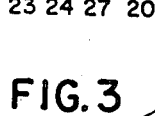
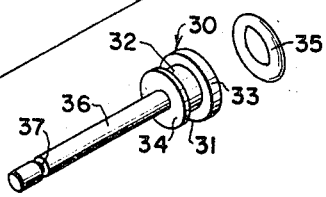
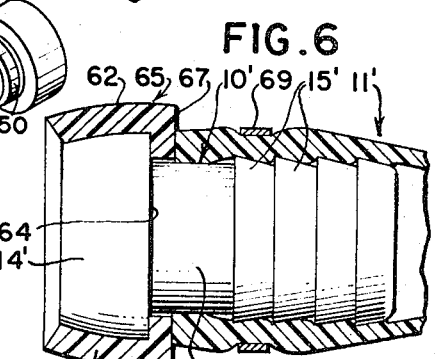
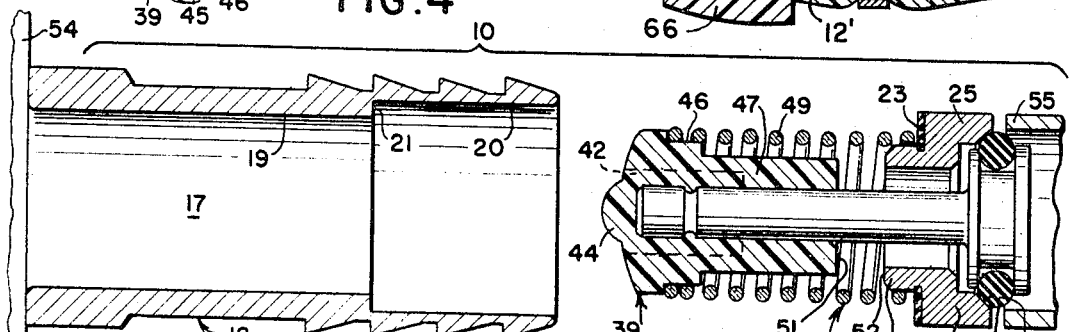
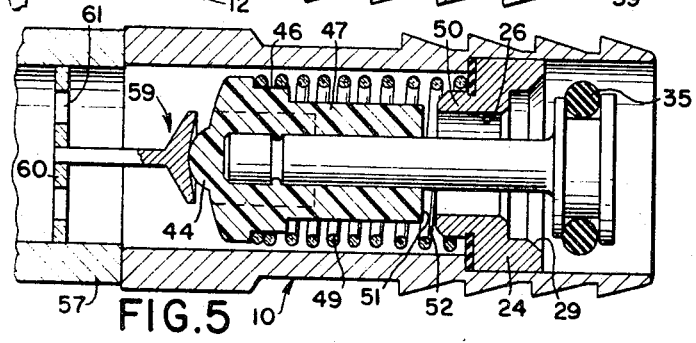
INVENTORS.
ARMEN BOGOSSIAN
HENRY H. MACKAL
ATTORNEY United States Patent Office 3,429,330
Patented Feb. 25, 1969

ABSTRACT OF THE DISCLOSURE

A mouthpiece for an orally operated valve, such as an inflation valve, such mouthpiece being secure against dislodgement from the valve and insuring that there will be no exposed metal parts which might injure the mouth or teeth of the user. In a first disclosed embodiment, the mouthpiece is integral with an inflation tube in which the valve is mounted; in a second disclosed embodiment, the mouthpiece is made separate from the inflation tube proper, the end of the inflation tube cooperating with the mouthpiece to retain the mouthpiece securely on the valve.

CROSS-REFERENCE TO RELATED APPLICATION

This application is a division of application Ser. No. 342,425, filed Feb. 4, 1964, now Patent No. 3,351,081.

BACKGROUND OF THE INVENTION

*Field of the invention.*—The invention pertains to a mouthpiece for an orally operated valve such as an inflation valve. The mouthpiece is particularly characterized by the security of its retention upon the valve, and by its insurance that there will be no exposed metal parts of the valve which could injure the mouth and teeth of the user.

*Description of the prior art.*—In British Patent No. 558,932 to Aspey, and French Patent No. 1,189,939 to Pennel and Flipo, the rubber or rubber-like tube engaged by the mouth of the user forms one set of the valve. Thus the action of the valve depends upon the condition of the tube and its disposition relative to the other parts of the valve. In the combination of the present invention, the valve and mouthpiece are separate, the action of the valve being independent of the condition and disposition of the mouthpiece relative to the valve.

In the U.S. patent to Carey, No. 1,192,860, the tube 2 forms a portion of the body of the valve, the body being completed by the forward end of the tube 1 to which the annular seat providing member 4 is attached. The tube 2 is insecurely held upon tube 1, and is not, properly speaking, a mouthpiece but is rather a coupling receiving the nipple 3.

The U.S. patent to Maholm, No. 3,064,287, discloses a mouthpiece 46 which is mounted on the forward end of the valve body by being telescoped thereover in the direction from front to rear. Because of its construction, the spacing of its rear end from flange 48, and the manner in which it is assembled on the valve, the mouthpiece 46 of Maholm can be inadvertently removed from the valve body, as by a downed flier struggling in the water to inflate his life vest.

SUMMARY OF THE INVENTION

In both of the disclosed embodiments, the valve is a check valve which is complete in itself. In the first embodiment the valve is telescoped completely within an inflation tube, the forward end of which forms an inflation mouthpiece. In the second embodiment, somewhat rearwardly of its forward end, the valve body is formed with an annular rearwardly facing shoulder of substantial radial height. The mouthpiece has a cavity in its forward end which is complementary to the portion of the valve body forwardly of the annular shoulder thereon. Rearwardly of such cavity the mouthpiece has a radially inwardly projecting annular flange, the forward surface of which engages the shoulder on the body of the valve and the radially inner surface of which embraces the barrel of the valve body.

The mouthpiece is securely retained upon the valve body against being pulled off forwardly therefrom by reason of its described engagement with the forward end of the valve body. The mouthpiece is additionally held on the valve body by the abutment of the forward end of an inflation tube, within which the rear end and intermediate portions of the valve body are telescoped, with the axially rear annular surface of the flange on the rear end of the mouthpiece.

BRIEF DESCRIPTION OF THE DRAWING

In the drawing, wherein like reference characters refer to like parts throughout the several views, FIG. 1 is a fragmentary view in end elevation of a first embodiment of oral inflation valve in accordance with the invention, such valve being shown mounted within the outer end of a flexible inflation tube, the view being taken in a direction from the outer, forward end of the tube toward the rear of such tube;

FIG. 2 is a view in axial vertical section through the inflation tube and oral inflation valve of FIG. 1, certain of the parts being shown in elevation, the section being taken along the line 2—2 in the direction of the arrows in FIG. 1;

FIG. 3 is an exploded view in isometric projection of the inner, sub-assembly of the valve of FIGS. 1 and 2;

FIG. 4 is an exploded view in vertical axial section of the inner, sub-assembly of the valve and the valve body, the sub-assembly and body being shown aligned in preparation for their assembly by a fragmentarily shown press;

FIG. 5 is a view in longitudinal axial section through the first embodiment of oral inflation valve of the invention, the valve being shown as in FIG. 2 but without the inflation tube 11, the valve being shown engaged by a deflating fitting of the vacuum type; and FIG. 6 is a view in side elevation on a small scale of a second embodiment of oral inflation valve in accordance with the invention, such valve having a separate mouthpiece mounted upon the forward end of the valve, the mouthpiece, the tube within which the valve is mounted, and the metal retaining band surrounding the tube and valve being shown in vertical axial section.

DESCRIPTION OF THE PREFERRED EMBODIMENTS

Although the fluid check valve of the present invention is not restricted thereto, it is particularly adapted for use as an oral inflation check valve, being well adapted for use as an oral inflation valve under adverse or emergency conditions. A typical one of such latter uses is that on an inflatable life vest, wherein the valve is ordinarily mounted telescoped within the outer end of a flexible inflation tube connected to the vest and communicating with the gas receiving space or spaces within the vest. Customarily, the life vest is not inflated until it is necessary to do so, since when inflated it is bulky and inhibits the movements of the wearer.

The conditions under which the vest will be used, of course, cannot be predicted; the user may have been thrown into the water, or he may have parachuted into it. The water may be the ocean and the waves may be high. If the valve is to be satisfactory, it should be quickly and easily operated, and should be secure in its retention of air in the life vest. To inflate the life vest or the like through the valve, the user has to put the end of the inflation valve and/or tube containing the valve to or within his lips. The emergency of the situation, the motion of the water, such as waves in the sea, taken with the possible excited and injured condition of the user, make him prone to impact and/or cutting injuries by the valve or inflation tube if they are of such construction as to make such injuries possible. The oral inflation valve of the present invention fulfills all the requirements set forth above for a safe, quickly and easily operated valve; the combination of such valve and the inflation tube in which it is mounted in accordance with the invention minimizes the danger of injury to the user when he inflates an article provided with such valve.

The valve of the invention is also characterized by the ease and economy of its manufacture, inspection, assembly, and testing. These results are primarily achieved by making the body which bears the fixed poppet valve seat thereof separate from the main tubular body of the valve. Such part may thus be accurately finished, inspected, and electrolytically plated when disposed separate from and outwardly of the main valve body. Not only that, but the parts which with the poppet seat-bearing body form an inner, self-sustaining sub-assembly of the valve, may be assembled separately from and outwardly of the valve body. The sub-assembly may be inspected for accuracy of assembly and operation before it is assembled into the valve body. The assembly of the sub-assembly into the valve body is itself a simple operation and may, as here disclosed, be done by press fitting the poppet seat-bearing member of the sub-assembly into its final, predetermined position in the valve body proper.

Turning now to the drawing in FIGS. 1–3, inclusive, there is shown a first embodiment of oral inflation valve in accordance with the invention. FIG. 4 illustrates the final step by which such valve is assembled. In FIG. 5 the valve is shown with the inner valve element thereof depressed to valve-open position by a vacuum tube provided with a valve stem depressor which opens the valve and retains it in that condition during the deflating of an inflatable hollow article with which the valve is used. In FIG. 6 there is shown a second embodiment of oral inflation valve mounted in the end of an inflation tube.

The first embodiment of valve, which is generally designated by the reference character 10, is shown in FIGS. 1 and 2 as telescoped within and sealingly engaging the inner surface of the outer end of a flexible inflation tube 11. The tube 11 may be made of resiliently extensible material, such as rubber or the like. The valve 10 has an elongated outer main body 12 of generally tubular configuration, body 12 having a shallow radially outwardly extending flange 14 on its forward end and a plurality (four shown) of annular beads or ribs 15 which are of saw-tooth shape in section and have forwardly facing radially directed shoulders. The outer diameter of the flange 14 and the beads 15 are such relative to the relaxed inner diameter of the tube 11 that when the valve 10 occupies the position shown within the end of the tube the inner surface of the tube is sealed to the peripheral surface of the valve body 12 and such body is secured within the tube against removal therefrom manually except by very considerable deliberate effort. Preferably the forward end of tube 11 extends beyond the forward end of the valve body 12 to form a hood 16 which protects the lips and teeth of the user of the inflation system against contact with the metal valve body. The body 12 of the valve is preferably made of corrosion resistant metal, a preferred embodiment of the valve having such body made of brass which is nickel plated. Such construction is desirable, since the valve may come into contact with corrosive media such as sea water.

The valve body 12 has a generally circular cylindrical passage 17 extending coaxially thereof and longitudinally therethrough. In its forward and intermediate portions passage 17 is in the form of a circular cylindrical portion 19 which has a first, smaller diameter; the remainder 20 of the passage, lying at the rear of the body 12, is of generally circular cylindrical shape, having a diameter somewhat exceeding that of portion 19. Portions 19 and 20 of passage 17 are joined by a rearwardly facing transverse annular shoulder 21 which lies in a plane at right angles to the axis of the valve body. The forward end of passage portion 20, for a length at least equal to the axial length of member 24, to be described, is circular cylindrical. The rear or outer end of passage portion 20 is of circular cylindrical configuration, having a diameter slightly larger than such forward end portion of the passage, for example, about .005 inch larger. The forward and rear end portions of passage portion 20 are smoothly connected by a forwardly converging frusto-conical portion. Such configuration of passage portion 20 facilitates the press assembly of member 24 in the valve body 12 in a manner to be described. Mounted within the valve body 12 and sealed thereto at the forward end of surface 20 and at the shoulder 21 is an inner, valve sub-assembly 22, the parts of which may be seen most clearly in FIG. 3.

Sub-assembly 22 has a sleeve-like member 24 having a circular cylindrical peripheral surface 25 which has a press fitted engagement with the forward end of portion 20 of the passage 17 in the valve body. A resilient annular sealing washer or gasket 23 is compressively engaged between the forward outer annular surface 28 of member 24 and the shoulder 21 of the valve body. Member 24 has an axially extending circular cylindrical passage 26 therethrough, passage 26 being provided at its rear end with a counterbore having a peripheral wall 27 and a bottom in the form of a transverse shoulder 18. At the rear end of the counterbore, member 24 is provided with a rearwardly facing rearwardly concave fixed annular valve seat 29 which has a surface in radial axial section which is part of a sphere. The diameter of passage 26 is relatively large, constituting a large fraction of the diameter of portion 19 of the passage 17 through the valve body, and the diameter of the fixed valve seat 29, of course, somewhat exceeds the diameter of passage 26. As a consequence of such construction of member 24, and that of the inner movable valve element 30, to be described, the valve when open presents little restriction against the flow of air either inwardly or outwardly therethrough.

The movable valve element of the valve is designated generally by the reference character 30. Element 30 has an enlarged spool-like configuration at its rear end, the spool having axially spaced rear and forward flanges 33 and 34, respectively, separated by an annular groove 32. The diameter of the forward flanges 34 is such that it fits freely within and does not contact the peripheral wall surface of the counterbore 27 in member 24 when the movable valve element 30 is in its closed position of FIG. 2. An annular sealing member 35 having a circular radial axial section is mounted within groove 32 of the spool, a portion of the forward surface of member 35 sealingly cooperating with the fixed valve seat 29 when the movable valve element is in the position shown in FIG. 2. Member 35 may be made of resilient material such as rubber, or rubber-like material such as Buna N, and may be snapped into place in the groove 32 during the making of the sub-assembly 22. Preferably, as shown, the radius of curvature of member 35 in radial axial section is somewhat less than the corresponding radius of curvature of seat 29.

The movable valve member 30 has a stem 36 which extends axially forwardly from the spool 31. The stem 36, which is of circular cylindrical configuration, has a diameter which is substantially less than that of passage 26 in member 24, so as to form an annular passage of large cross sectional area between them. Adjacent its forward end the stem 36 is provided with an annular groove 37 by means of which a stem locating and guiding member 39, to be described, is secured to the stem.

Member 39, which is shown more clearly in FIG. 3, has a forward generally circular cylindrical portion 42 having an axially extending, forwardly blind, passage 40 therein. The forward end of stem 36 is snugly received within passage 40 and is retained therein by an annular bead 41 which projects inwardly from the passage 40 and is snapped into the above-mentioned groove 37 on the stem, as shown in FIG. 2. The forward end of portion 32 of member 39 is in the form of a part-spherical button 44; the outer end of button 44, when the valve is closed, lies somewhat inwardly of the forward end of the valve body 12 but accessible from the forward end of the body so that it may be depressed to open the valve, as by user's finger.

Member 39 is further provided with a plurality (four shown) of annularly spaced radially extending wings 45 having axially rearwardly curved forward edges 43. The wings 45 have radially outer part circular cylindrical surfaces which are of substantial axial length; such surfaces 48 lie on a circle which is generally coaxial of but slightly smaller than portion 19 of passage 17 through the valve body 12. The surfaces 48 of wings 45 thus substantially accurately but slidingly engage portion 19 of the passage through the valve body so as to maintain the outer, forward end of the stem 36 coaxial of the passage 17. Engagement between the outer surfaces 48 of the wings 45 and passage portion 19 is restricted, however, to a relatively short distance axially of the valve, so that the rear end of the movable valve element 30, when such valve element is in its open position, is free for substantial movement in all directions transverse to the axis even when the forward flange 34 lies within the somewhat larger diametered counterbore 27 in member 24. Accordingly, when the valve moves into its closed position, as shown in FIG. 2, it is free within limits to find its own seat. Thus when the valve element is in its closed position, the unit sealing pressure between seat 29 in the member 24 and the sealing means 35 on the movable valve element 30 is uniform completely thereabout.

Each of the wings 45 immediately rearwardly of its passage engaging surface 48 is formed with a sharp transverse shoulder which with a rearwardly axially directed surface extending from the root of the shoulder form a part 46 of a seat for the forward end of a coil compression spring 49 which constantly urges the movable valve element 30 toward its forward, valve-closing position. Rearwardly of the spring seat-forming portions 46 the wings 45 are continued as smaller diametered plate-like members 47 which lie telescoped within the forward end of spring 49 and overlie and resiliently engage the intermediate portion of the stem 36, so as both to aid in the retention of member 39 on the stem coaxially thereof and to form a stop for the movable valve element in its retracted, open position. Such stop functions in a manner to be described below. The coil compression spring 49, which is preferably made of corrosion resistant metal, such as stainless steel, has an outer diameter which is slightly less than that of passage portion 19 so as to be freely slidable but accurately guided therewithin. The rear end of spring 49 is accurately received in a spring seat which is formed in part by the outer peripheral surface of a forwardly extending axially located hollow boss 50 on the forward end of the member 24 and in part by the forward surface of the sealing gasket 23. As shown, the boss 50 is provided with a shallow groove at its root, so as stably to retain the sealing gasket 23 on the boss during the making of the sub-assembly 22 and the mounting of the sub-assembly in the valve body 12.

The spring 49 is preferably one having a rather small compressive force, sufficient only to insure the normally closed positioning of the valve member 30, as shown in FIG. 2. It will be understood that the pressure of the air within an inflated hollow article with which the valve is used, acting upon the spool 31, is primarily relied upon to exert sealing pressure of sealing means 35 against the fixed valve seat 29. Spring 49 also preferably is one having a "low rate," that is, one whose compressive force in the range of movement of the valve element 30 does not change greatly between the valve open and valve closed positions.

In the illustrative embodiments, the dimensions of the parts, including the axial lengths of the portions 47 of member 39 and the boss 50 are such that when the rear end surfaces 51 of members 47 engage the forward surface 52 of boss 50 the successive turns of the coil compression spring 49 remain appreciably spaced from each other. This feature is substantially illustrated in FIG. 5, wherein the movable valve element 30 has been depressed to lie in a position close to its inner terminal position. Thus, there is preserved, even in such inner terminal position of the movable valve element, a free path through the spring for the flow of air therethrough either in the direction shown in FIG. 5, during an article deflating operation, or in the reverse direction during an article inflating operation. In the illustrative embodiment of valve, such path of flow of air through the valve is additional to that past the central portion 42 of member 39, between parts 47 of member 39, through passage 26 in member 24 and past the open valve seat.

The described construction of the valve 10 is such that the sub-assembly 22 may be completely assembled separate from and exteriorly of the body 12 of the valve. The seat-bearing member 24 is, like the body 12, preferably made of corrosion resistant metal, for example, brass which has been nickel plated electrolytically. If the valve body were made initially with a seat-bearing flange integral therewith, it would be very difficult and expensive to insure not only the accurate machining and finishing of such parts, including the seat 29 in the flange, to accurate shape, and it would be difficult to inspect such valve body with its integral seat-bearing flange for accuracy of dimensions and the perfection of finish of the valve seat 29, but it would be difficult to plate it or treat it electrolytically uniformly upon all of its surface.

As is well known, in an electrolytic plating bath, the plating metal tends to be deposited to a greater thickness upon the outer surfaces of a hollow article than upon its inner surfaces; the plating operation is particularly prone to failure at inner corners of an article and of grooves, recesses and the like therein. In accordance with the present invention, the substantially uniform plating of the body 12 of the valve is not difficult because of the relatively large diametered passage 17 therethrough, such passage having only one relatively low shoulder 21 therein. The substantially uniform plating of the seat-bearing sleeve-like member 24 by itself is also not difficult, because of the relatively large diameter of the passage 26 and the counterbore 27. In any event, after it has been thus plated, the member 24, including the seat 29 therein, is available for close visual inspection and measurement if necessary; any member 24 which on inspection proves to be unsatisfactory may thus be readily discarded or reprocessed. This, of course, saves considerable expense, since only the member 24 need then be replaced.

The parts forming the sub-assembly 22 may be assembled by first mounting the sealing gasket 23 over the boss 50 on member 24, snapping the inner edge of the gasket into the groove at the root of the boss. Following this, the annular sealing member 35 may be snapped into the groove 32 on the spool 31, and the stem 36 of member 30 may be inserted forwardly through the passage 26 in member 24. The formation of the sub-assembly is completed by positioning the rear end of spring 49 about the boss 50 and mounting the member 39 on the forward end of stem 36, pressing it rearwardly on the stem until it is fully engaged and locked therewith as shown in FIG. 2.

After the sub-assembly 22 has been made, it as a whole may be inspected and tested while it is still separate from and outside of the body 12 of the valve. Thus any possible mismounting of the parts, misalignment thereof, and lack of suitable seating between the member 35 and its seat 29 may be readily detected, and the trouble overcome, or the part or parts of the sub-assembly replaced. Only after the sub-assembly 22 has been thus formed and has passed inspection is it mounted in the valve body 12.

The mounting of a sub-assembly 22 in a valve body 12 is schematically illustrated in FIG. 4. As there shown the sub-assembly 22 is axially aligned with the valve body 12 with both parts facing forwardly. The forward end of the sub-assembly is then telescoped within the rear end of the valve body, and the member 24 of the sub-assembly is then pressed forwardly until the sealing washer 23 is forcibly compressed against and forms a seal with shoulder 21 of the valve body. To insure the secure rentention of member 24 in the valve body, the member 24 is made so that its outer diameter somewhat exceeds the inner diameter of the part of portion 20 of the passage 17 which is to engage the outer surface of member 24 when such member is fully assembled as shown in FIG. 2. A difference in such diameters is such that a fairly large force exerted by a press to effect the thrusting of the member 24 to its fully assembled position in the valve body 12 is sufficient to retain the member 24 in place in body 12 under all conditions of use of the valve. Such force may be fairly high, and may, for example, be as high as 500 pounds.

In FIG. 4 the last described assembling operation is shown as being carried out with the valve body 12 and the sub-assembly 22 disposed horizontally. It may, however, be done with the valve body disposed vertically with its forward end down, the sub-assembly then being dropped forward end down into the valve body. Following the initial telescoping of the forward end of the sub-assembly into the rear of the valve body, the member 24 may be thrust, as described, axially of the valve body to its finally assembled position. To carry out this operation, there may be employed a press having a fixed platen somewhat schematically indicated at 54 in FIG. 4, with which the forward end of the valve body 12 is in contact, and a press plunger, schematically shown at 55, in the form of a tube which loosely receives the annular sealing member 35 within its forward end. The forward or outer end surface of plunger 55 engages the annular rear end surface of member 24 radially outwardly of seat 29 in member 24 and thus can not damage the seat, nor does it distort or otherwise damage any part of the member 24. The above-described tapering of the outer or rear end part of passage portion 20 in valve body 12 permits the member 24 to be introduced into and pressed home smoothly in passage portion 20 without causing any scratches in the passage, and eliminates corrosion which would occur at any scratched portions of the bore.

It is customary, in the production of inflatable articles such as life vests, to test the valve, the inflation tube, and its sealing connection to the tube, and the inflatable hollow article. This may be done by inflating the article through the valve to a predetermined pressure, and leaving the article thus inflated for an appreciable period, such as a day or more, to detect the presence of any leaks in the valve, tube, and the inflatable article. Since such test is customarily carried out on a large number of articles, it is usual to inflate the articles by the use of a fitting applied to the outer end of the inflation tube, such fitting being connected to a source of compressed air, and at the end of the test quickly to deflate the article through the valve by applying a fitting connected to a vacuum line to the outer end of the inflation tube. The construction of the valve of the present invention is such that not only does it easily permit the rapid, abnormal inflating and deflating operations which are carried during the described testing, but the valve is inherently protected against being damaged by the test procedure.

The accurate guiding of the forward end of the stem 36 of the movable valve element 30 insures that the stem and the button 44 by which the valve element is depressed are positioned axially of the valve body at all times. This is important when the fitting presented to the forward end of the inflation tube has a central valve element depressing member, as is shown at 59 in FIG. 5 in connection with the vacuum fitting 57. A fitting similar to fitting 57 may be employed to inflate the articles being tested. Thus when the fitting is placed within the hood 16 with its end against the forward end of the valve body 12 and substantially coaxially thereof, the proper engagement between the valve element depressor and the button 44 is assured.

Further, no matter how violent and rapid are the inflating and deflating operations, the valve cannot be damaged or jammed, or the passage therethrough unduly restricted. A rush of air from an inflation fitting during testing can at most cause the movable valve element to be retracted to a position wherein the rear end surfaces 51 of members 47 engage the forward annular surface 52 of boss 50. As noted, and is clear from FIG. 5, in such fully retracted position of the movable valve element 30 the successive turns of spring 49 are appreciably spaced; there is thus preserved at all times a path of very substantial area from the passage 26 in member 24, between the turns of spring 49, and through the spaces between the successive wings 45 on member 39 which guides and positions the forward end of the stem 36 of the movable valve element. The engagement between surfaces 51, which lie in a single transverse plane, and the annular surface 52 of boss 50, in such fully retracted position of the movable valve element 30, acts in conjunction with the engagement between edges 48 of wings 45 and the wall of portion 19 of passage 17 to maintain the movable valve element against canting out of substantial coincidence with the axis of the passage 17 in the valve body.

As noted, FIG. 5 shows the valve 10 cooperating with a vacuum deflating fitting having a tube-like portion 57 presented to the outer end of the valve. The central valve element depressor 59 of portion 57 is shown as having a shallow cup-like head which receives and thrusts the button 44 rearwardly to retain the valve open under vacuum. Depressor 59 has a central stem which is mounted in a transverse plate or bridge 60 affixed to fitting 57 inwardly thereof, the member 60 having one or more holes 61 therethrough for the exhaustion of air through the valve, as shown by the arrows. The flow of air, during inflation of an article, is, of course, in the reverse direction.

In FIG. 6 there is shown a second embodiment of valve 10 in accordance with the invention, such valve being shown mounted in the outer end of an inflation tube 11: Parts in FIG. 6 which are similar to those of FIGS. 1–5, inclusive, are designated by the same reference characters but with an added prime.

Valve 10' is provided with a separate mouthpiece 65, which may be made of resilient material such as neoprene, such mouthpiece surrounding the forward end of the valve and projecting somewhat forwardly therebeyond to form a lip or mouth protecting hood. A flange 14' is disposed on the forward end of valve body 12'. Flange 14', which preferably is made integral with the body 12', has a rounded peripheral surface 62 which extends from a deep transverse annular shoulder 64 at the rear end thereof and curves inwardly smoothly in a forward direction, as shown. The mouthpiece 65 has a curved main wall 66 of substantially uniform thickness overlying the outer surface of flange 14' and a radially inwardly directed annular flange 67 on its rear end which overlies the shoulder 64 of flange 14'. The mouthpiece 65 preferably is stretched somewhat as it lies upon flange 14'; thus the mouthpiece 65 preferably snugly engages the surfaces of the flange 14' so that it can not be accidentally removed therefrom.

The forward end of the inflation tube 11' is shown snugly abutting the rear surface of the flange 67 of the mouthpiece, so that the valve 10' is completely sheathed by the tube and the mouthpiece. Thus no metal parts are exposed at the forward end of the inflation tube so that the lips, teeth, or any part of the mouth of the user can not normally come into contact with any metal parts of the valve. It may be desired to employ means in addition to the beads or ridges 15' to retain the valve 10' in tube 11', to prevent accidental removal of the valve from the tube by pulling forwardly upon the mouthpiece 65. For this purpose there may be employed a band 69, made of ductile material such as brass. Band 69 may be initially made round, and of an inner diameter such that it may be freely telescoped over the tube 11' to overlie the intermediate ridges 15'. Following this, the band 69 may be crimped by a conventional tool which engages and deforms it inwardly at a plurality of angularly spaced locations to contact it upon the tube 11' and to press the tube forcibly inwardly into gripping engagement with the ridges 15'. It is to be understood that the use of the band 69 is optional. When it is employed, its use is generally only precautionary, since the valve 10' is adequately retained in the tube 11' by its frictional engagement therewith.

The advantages of the valve of the present invention have, in the main, been set out above, as a result of its novel construction, the novel combination thereof with an inflation tube, and the novel method of its assembly. The valve in preferred embodiments presents no parts which can corrode or deteriorate as a result of contact with corrosive media such as sea water or dampness. The valve stem guiding and operating member 39 may be made, as indicated, of plastic material which has a low coefficient of friction with the metal surface of portion 19 of passage 17. A satisfactory material for forming member 39, which may be molded to shape, is acetal resin; it is to be understood that other suitable materials may be used, as desired, for the making of member 39. The relatively light compressive force of spring 49 is such that whereas it holds the movable valve element 30 normally closed it does not deform the annular sealing member 35 by reason of its engagement with seat 29, nor does member 35 tend to stick to the seat despite long periods in which the valve is not opened. Thus the valve is ready at all times for instant use as required.

In the illustrative embodiment the transverse shoulder 18 on member 24 cooperates with the forward end surface of flange 34 to stop the forward movement of the movable valve element 30 in an outer or forward direction when the valve element is subjected to appreciable outwardly directed force additional to that exerted by spring 49. In FIG. 2 the valve element is shown held closed by the spring. When the inflated article with which the valve is used is inflated to an appreciable pressure, such pressure will thrust the movable valve element forwardly, still more forcibly to close the valve, until the forward end surface of flange 34 engages and is stopped by shoulder 18. Such construction prevents sticking of the sealing member 35 to or its excessive deformation by the fixed valve seat 29 under high pressure operating conditions.

Although in the described preferred embodiment the body 12 of the valve, the member 24, and the movable valve element 30 have been described as being made of brass, and as being nickel plated, it is obvious that they may be made of other suitable strong, durable materials. Such parts may, for example, be made of aluminum, which may be subsequently anodized. With such construction, which requires electrolytic treatment of the parts, there are realized the same advantages from the making of member 24 separate from the body 12, and the preliminary formation of the sub-assembly 22, as in the embodiment above particularly described.

Further, although the valves 10 and 10' have been described in connection with their use as the primary means by which an inflatable hollow article, such as a life vest, is inflated, such valves may be used as an adjunct to other inflation means for such article. Thus the article, such as a life vest, may also be equipped with an automatic means of inflation such as an inflating means provided with a cylinder of compressed $CO_2$ as a source of gas. With such arrangement, if the $CO_2$ or other compressed gas source fails, the oral inflation valve is used. If the cylinder of compressed gas is insufficient fully to inflate the article, such as may be supplemented by air supplied to it by further oral inflation of the article through the valve of the invention.

Although only a limited number of embodiments of the invention have been illustrated herein, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art. The body of the valve may have a configuration of any shape suitable for the use to which the valve is to be put.

We claim:

1. In oral air inflation equipment, the combination of a flexible resilient inflation tube, and a manually releasable check valve having an elongated body telescoped within the tube at the outer end thereof, a normally closed movable valve element within the valve body, and a manually depressable central stem member exposed at the forward end of the valve for moving the valve element to open the valve, a flexible resilient annular mouth-piece separate from the valve overlying the forward end of the valve body and projecting somewhat outwardly therebeyond, the mouthpiece and the tube completely enclosing the peripheral surface of the valve body.

2. The combination as claimed in claim 1, wherein the mouthpiece is integrally connected to and forms the forward outer end of the tube.

3. The combination as claimed in claim 1, wherein the mouthpiece is made as a part separate from the tube, the rear end of the mouthpiece abutting the forward end of the tube completely around the valve body.

4. The combination as claimed in claim 3, comprising separate first and second means respectively to retain the valve body in the tube and to retain the mouthpiece on the valve body, the first of said means comprising annular grooves and ridges on the outer surface of the valve body adjacent the rear end thereof and a band of metal overlying the outer surface of the tube at the location of said annular grooves and compressively engaging the tube to thrust it inwardly into engagement with said grooves and ridges, and the second of said means comprises a radially outwardly extending flange on one of the members consisting of the forward end of the valve body and the mouthpiece, and a radially inwardly extending flange on the other of such members.

5. The combination as claimed in claim 3, comprising separate first and second means respectively to retain the valve body in the tube and to retain the mouthpiece on the valve body, the first of said means comprising annular grooves and ridges on the outer surface of the valve body adjacent the rear end thereof and a band of metal overlying the outer surface of the tube at the location of said annular grooves and compressively engaging the tube to thrust it inwardly into engagement with said grooves and ridges, and the second of said means comprises a radially outwardly extending flange on the forward end of the valve body and a radially inwardly extending flange adjacent the rear end of the mouthpiece lying rearwardly of the flange on the forward end of the valve body.

References Cited

UNITED STATES PATENTS

| | | | |
|---|---|---|---|
| 2,502,301 | 3/1950 | Alderfer | 137—223 |
| 2,855,946 | 10/1958 | Mackal | 137—223 |
| 3,064,287 | 11/1962 | Maholm | 137—223 |
| 3,351,081 | 11/1967 | Bogossian et al. | 137—223 |

FOREIGN PATENTS

| | | |
|---|---|---|
| 558,932 | 1/1944 | Great Britain. |
| 1,189,939 | 10/1959 | France. |

WILLIAM F. O'DEA, *Primary Examiner.*

DENNIS H. LAMBERT, *Assistant Examiner.*

U.S. Cl. X.R.

9—311; 46—90